United States Patent Office 3,365,776
Patented Jan. 30, 1968

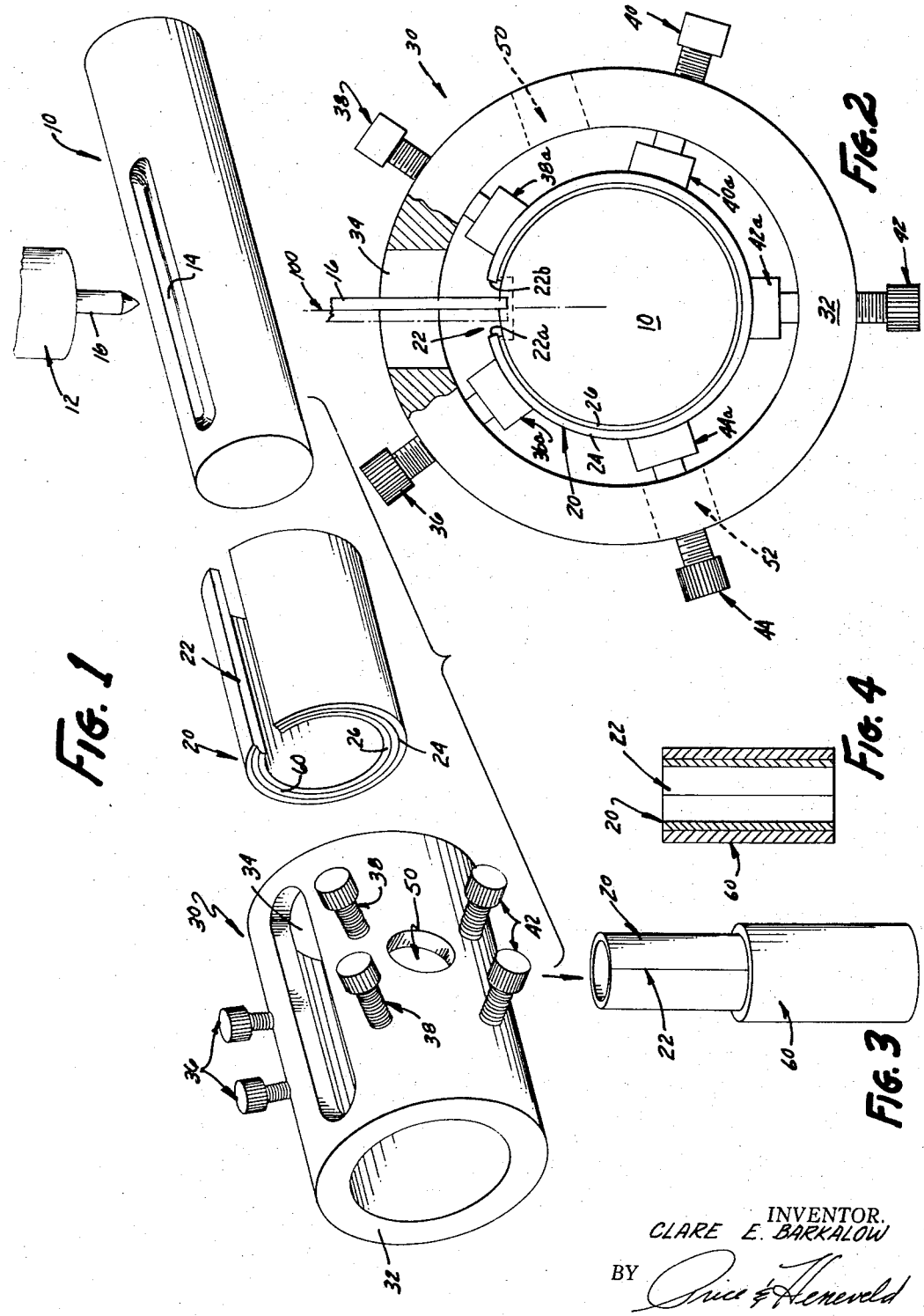

3,365,776
METHOD OF PREPARING BEARINGS
Clare E. Barkalow, Comstock Park, Mich., assignor to Michigan Instruments Incorporated, Grand Rapids, Mich., a corporation of Michigan
Filed Sept. 22, 1965, Ser. No. 489,143
12 Claims. (Cl. 29—149.5)

ABSTRACT OF THE DISCLOSURE

The machining of split-sleeve bearings to precisely obtain a desired bearing diameter with very precise bearing circularity after the bearing has been circumferentially contracted to close the split in its sidewall, wherein the bearing is resiliently expanded and placed about an arbor, the bearing is then wrapped tightly about the arbor to conform thereto by progressively and sequentially tightening pressure pads externally about the bearing, at a plurality of locations spaced circumferentially around the bearing, and the two oppositely-disposed faces of the split in the bearing are then machined along lines corresponding to a pair of different radii of both the bearing and the supporting arbor, such that when the bearing is subsequently removed from the arbor and circumferentially contracted to close its split, the faces of the split will meet across substantially the entire cross section of the bearing, i.e., flush, with the split completely closed on both the interior and exterior surface of the bearing. Moreover, the faces of the split in the bearing are machined so as to have a predetermined spacing therebetween selected according to a particular relationship, such that the inside and outside diameter which the bearing will have when contracted to close its split sidewall will precisely correspond to desired diameters.

This invention relates to the preparation of bearings of the split-sleeve type, and more particularly to a method for the precision machining of such bearings to ensure that when closed by circumferential contraction the bearings will possess precise circularity and a precise predetermined inside diameter.

Several different types of split-sleeve bearings are presently available commercially for use in a number of different applications. Such bearings are generally formed initially from a flat sheet of bearing stock which is cylindrically curved, and the gap between the ends of the curved stock form the split in the bearing sleeve. Very often in the actual installation and usage of these bearings, as for example inserting them into an enclosing cylinder or sleeve, they are circumferentially contracted to close the split therein. This causes considerable difficulty, since the circularity of the bearing changes when it is contracted, as does the diametral dimensions thereof. Further, the end faces of the split in the bearing are, in the form in which such bearings are generally available, perpendicular to the two sides of the bearing, and consequently when these end faces are brought together by closing the split, the faces do not come into full matching abutment with each other but instead meet along a single line of contact. If it is sought to first machine the faces of the split so that they will match when the bearing is contracted, considerable difficulty results if precision is to be maintained, since the distance between the split faces is changed and the inner and outer diameters of the bearing become unpredictable and difficult to control.

These problems are even further magnified in the case of a particular sintered bearing which presently is commerically recognized as the "DU" type or series, manufactured by the Garlock Company. These particular bearings are formed from a flat sheet of bearing material such as steel, and have an internal coating of sintered bronze and leaded Teflon, which gives the bearing the desirable properties of high structural strength, low friction, low wear, and dispenses with the need for any lubrication. However, such bearings as sold are typically oversized for the application, and if the application demands precision control of the internal diameter of the contracted bearing (as for example to $\frac{1}{1000}$ inch), the available bearings vary beyond useable dimensional limits with regard to internal diameter ("ID"), roundness or circularity, and wall thickness. Consequently, machining is mandatory to produce the desired results. However, in the case of the "DU" bearing the composite sintered bearing structure is somewhat resilient, and this makes precise measurement and machining extremely difficult.

Accordingly, it is a major object of the present invention to provide a method of preparing split-sleeve bearings, particularly those of the "DU" type, by precise machining of the faces of the split therein to produce truly radial surfaces on the faces and to provide precise control of the circumferential length of the bearing. The novel method further provides for the accurate predicting of the average outside diameter ("OD") which the bearing sleeve will have after it has been contracted to close the split therein. Consequently, the present method will consistently provide finished bearings which when circumferentially closed will possess precise circularity and which will consistently have a predetermined desired closed-bearing ID.

The foregoing major objectives of the invention, together with other objects and numerous advantages provided thereby, will become increasingly apparent following consideration of the ensuing specification and its appended claims, particularly when taken in conjunction with the accompanying drawings setting forth a preferred embodiment thereof.

In the drawings:

FIG. 1 is a fragmentary, exploded, frontal perspective view illustrating preferred apparatus and the manner of using same to practice the novel method;

FIG. 2 is an enlarged end elevation, partially in section, showing the elements of FIG. 1 interengaged with each other in the manner contemplated;

FIG. 3 is a frontal perspective view showing the assembly of a finished split sleeve bearing within a typical solid cylindrical sleeve; and FIG. 4 is a central section of a fully assembled bearing within its enclosing cylinder.

Briefly stated, the present invention provides a method of preparing bearings of the split-sleeve type so as to provide finished bearings which when circumferentially contracted to close their slots, will possess precise circularity and which will consistently possess a precise desired closed-bearing ID. The method basically contemplates first telescoping the split-sleeve bearing over a suitable arbor, then securing the bearing in place upon the arbor, then machining a first face of the split in the bearing radially with respect to the arbor, then determining the necessary separation distance of the faces of the split to make the bearing a preselected inside diameter when the faces are brought into abutment by closing the bearing, changing the position of the arbor and bearing relative to the machining means a precise amount equivalent to the separation distance which has been determined, and then machining the second face of the split in the bearing radially with respect to the arbor at the said determined separation distance. The method further contemplates the measuring of the machined bearing while on the arbor, and provides for the calculation from this measurement of the average outside diameter that the bearing will have when it has been contracted to close its split, as for insertion into an outer cylinder or the like.

Referring now in more detail to the novel method, and to the drawings which illustrate apparatus for practicing it, in FIG. 1 the arbor utilized in the method is indicated at 10, and the rotary head and cutting tool of a suitable vertical milling machine is shown at 12, in its nominal position above the arbor. It will be noted that the arbor has an elongated recess 14 formed in its upper surface, and that the depending cutting tool 16 of the milling machine is in alignment with this recess.

The bearing which is to be processed or prepared in accordance with the novel method is indicated at 20. The arbor 10 should be slightly larger in diameter than the normal inside diameter of the split bearing, and the longitudinally-extending split or slot 22 in the bearing should be oriented upwardly, at the top of the bearing, in alignment with the recess 14 in the arbor. A typical DU type bearing is illustrated in FIG. 1 since, as has been stated, the method has particularly great utility when used to prepare such bearings. The bearing 20 thus has an outer steel sleeve 24, and an inner coating of the sintered bronze and leaded Teflon which has been previously noted.

A machining fixture for use with the method is indicated at 30. This is basically a cylindrical steel shell having a continuous wall portion 32, but it includes an elongated aperture 34 which extends through the wall portion 32 and is at least as large as the recess 14 in the arbor 10. It will be noted that a number of pairs of threaded bolt means such as 36, 38, 40, and 42 are arranged regularly about the fixture 30 and extend into its wall portion 32. These operate to control pressure pads positioned within the fixture 30, which will be described subsequently.

In preparing the bearing 20 shown in FIG. 1, the bearing is first circumferentially expanded a slight amount and telescoped over the slightly larger arbor 10, with the split 22 of the bearing aligned centrally over the recess 14 in the arbor (see FIG. 2). In this position, the bearing will snugly encircle the arbor, due to the natural resilience of the bearing, which tends to restore it to its nominal diameter. The machining fixture 30 is then telescoped over both the bearing and the arbor, with the recess 34 in the fixture aligned centrally with the split 22 in the bearing and the recess 14 of the arbor.

Inside the fixture 30 are a number of generaly elongate, metal pressure pads 36a, 38a, 40a, 42a, and 44a, each secured to the correspondingly numbered bolt means 36, 38, 40, 42, and 44, respectively. The bolt means are threaded through the wall 32 of the fixture, and their ends are rotatably connected or journaled in the pressure pads. Consequently, as the bolt means are turned from outside the fixture, the pressure pads therewithin will be moved radially relative to the fixture. When the fixture 30 has been placed over both the arbor and the bearing which encircles it, the fixture is securely tightened in position through the use of the threaded bolt means.

The manner of accomplishing this is first to bring each of the pressure pads into light contact with the outer sleeve 24 of the bearing, and then to "wrap" the bearing tightly about the arbor by sequentially tightening the bolt means, beginning with the one designated 42 at the bottom of the fixture, and progressing upwardly toward the top of the arbor and bearing, as by next adjusting bolt means 40, then 44, then 38, and finally 36. In this manner, all irregularities in the circularity of the bearing will be removed, the bearing will be tightly wrapped about the arbor, and the fixture will be securely mounted in place about both the bearing and the arbor.

Only moderate pressure need be exerted by the pressure pads and their associated bolt means, but it has been noted in actual practice that the sintered inner coating 26 of the bearing will undergo a very small compression as a result of the clamping pressure applied to the bearing, due to the inherently resilient nature of the sintered coating previously noted. For example, for a bearing having a coating 26 which is on the order of about twenty thousandths (.020) inch, a compression of approximately three thousandths (.003) inch may be expected. This figure may be suitably determined by empirical methods, and is used in the calculations involved in the present method, wherein it is designated C.

The next step in the method is to operate the milling head 12, and lower the cutting tool 16 associated therewith through the aperture 34 in the fixture 30, through the slot or split 22 in the bearing, and partially into the recess 14 in the arbor 10. The cutting tool, a rotary device which will make planar cuts along any surface placed in contact therewith, is first arranged in the manner shown by the solid lines in FIG. 2, wherein the leftward edge of the cutting tool lies coincident with the vertical center line of the arbor, bearing, and fixture, here designated 100. The arbor, bearing, and fixture are then rotated clockwise slightly, so as to bring the face 22a of the split 22 in the bearing into contact with the cutting tool 16. This will produce a machining of the face 22a that will leave it truly radial, both with respect to the arbor 10 and also with respect to the bearing 20 itself.

The bearing may now be made to have a desired ID under fully contracted conditions (wherein the split 22 is closed) by machining the face 22b of the split in a manner analogous to that used in connection with face 22a if the correct final separation distance between the two faces is known. In its most convenient form, this distance should be in the form of an angle, and this may be calculated by use of the expression $$\phi = \frac{360((OD_a - C) - ID)}{OD_a - D}$$

wherein $OD_a$ is the known outer diameter of the arbor, C is the effective diametral compression of the composite bearing coating 26 under the force of the pressure pads 38a, 40a, etc., and ID is the desired inside diameter which the bearing is to have when contracted to close the slot.

When the angular separation distance $\phi$ has been computed in the foregoing manner, the cutting tool 16 is moved to a second position (shown in phantom in FIG. 2) wherein its rightward edge lies coincident with the center line 100. The arbor 10 with the attached bearing 20 and fixture 30 is then rotated counterclockwise a precise angle corresponding to the computed angle $\phi$. The cutting tool 16 is then lowered, to mill face 22b of the bearing split precisely radially of the arbor, and at a distance from the radially-machined face 22a that is precisely equivalent to the angular distance $\phi$.

Once the foregoing machining operations have been completed, the true average OD which the completed bearing will have when fully circumferentially contracted to close its split may be accurately calculated. First, an empirical measurement is made of the actual OD of the bearing in its expanded form upon the arbor 10, as by means of a suitable micrometer, for which access is afforded by a pair of apertures 50 and 52 formed through the wall portion 32 of the fixture 30. The closed-bearing OD may then be calculated by use of the expression $$OD = \frac{OD_m(360 - \phi)}{360}$$

wherein $OD_m$ is the empirical measurement of the outer diameter of the expanded bearing upon the arbor, and $\phi$ is the previously computed angular separation of the machined faces of the bearing split. Knowledge of the closed-bearing OD is extremely useful since it establishes the inner diameter of the outer cylinder, sleeve, or journal 60 in which the split sleeve bearing is press fitted to form the composite bearing assembly. (Note FIGS. 3 and 4.) It is to be noted specifically that if closed-bearing OD is already known, the insertion of the split sleeve bearing into the outer cylinder 60 is greatly simplified. The cylinder ID may be accurately sized previously and, if the inner portion of one end of the split sleeve 20 is bevelled, as is indicated at 62 (FIG. 1), the bearing may readily be contracted to close its split as it is inserted into the outer cylinder 60, merely by centering the bevel 62 within the opening of the cylinder 60, as shown in FIG. 3, and pressing the bearing into the position shown in FIG. 4, wherein the split 22 is precisely closed.

By practicing the foregoing novel method, bearings of the split-sleeve type, and particularly those in the DU category having composite inner coatings which make accurate measurement and machining difficult, may be prepared so that they will possess a precise predetermined inside diameter when contracted to close the split in their periphery. The bearings will have excellent circularity when contracted and installed under working conditions, and their closed-bearing outside diameter may accurately be predicted before the bearings are contracted and installed, so as to greatly facilitate the assembly. Consequently, the performance of the installed bearings is considerably improved, and this serves to increase the number of applications in which such bearings are suitable.

Although the present invention method has been described throughout this specification in connection with split-sleeve bearings, it will be obvious that the concepts underlying the method may readily be applied in like manner to a wide variety of split-sleeve cylindrical structures, all of which may not in a strict sense actually be "bearings." Hence, the term "split-sleeve-bearing" as used herein is intended in a broad sense and should be interpreted as encompassing split-sleeve cylindrical structures generally.

Having now described the nature of the method, and having illustrated and described preferred apparatus for practicing the method, it may be that certain variations and modifications in the application of the method or in the structure of the apparatus herein shown will occur to those skilled in the art upon becoming familiar with the foregoing disclosure. All such variations and modifications as utilize the spirit and underlying concept of the invention are thus to be considered as within the scope of the claims appended herebelow, unless these claims by their language specifically state otherwise.

I claim:

1. A method of preparing bearings of the split-sleeve type to provide bearings which when circumferentially closed will possess precise circuitry, and which will consistently possess a precise desired closed-bearing inside diameter, said method comprising the steps: telescoping the split-sleeve bearing over a suitable arbor; securing said bearing in place upon said arbor; machining a first face of the said split in the bearing on a line falling on a radius of both said arbor and said bearing; and machining a second face of the split in said bearing on a radius of both said arbor and said bearing at a predetermined separation distance from said first face, said predetermined distance being the necessary separation distance of the faces of said split to make said bearing a preselected inside diameter when the said faces are brought into abutment by circumferential contraction of the bearing to close the split; said faces meeting on substantially the full cross-sectional area of the bearing sleeve to tightly close said split around both the internal and external periphery of said bearing.

2. A method of preparing bearings of the split-sleeve type to provide bearings which when circumferentially closed will possess precise circularity, and which will consistently possess a precise desired closed-bearing inside diameter, said method comprising the steps: telescoping the split-sleeve bearing over a suitable arbor; securing said bearing in place upon said arbor; machining a first face of the said split in the bearing radially with respect to said arbor; rotating said arbor and bearing together an amount equal to a predetermined angular separation; and machining a second face of the split in said bearing radially with respect to said arbor at the rotated position of the arbor and bearing, said predetermined angular separation being the necessary angular separation of the faces of said split to make said bearing a preselected inside diameter when the said faces are brought into abutment by circumferential contraction of the bearing to close the split.

3. A method of preparing bearings of the split-sleeve type to provide bearings which when circumferentially closed will possess circularity, and which will consistently possess a precise desired closed-bearing inside diameter, said method comprising the steps: resiliently circumferentially expanding a split-sleeve bearing; telescoping the expanded bearing over an arbor having an outside diameter slightly larger than the normal inside diameter of such bearing; machining a first face of said split in the bearing radially with respect to said arbor; rotating said arbor and bearing together an amount equal to a predetermined angular separation; and machining a second face of the split in said bearing radially with respect to said arbor at the rotated position of the arbor and bearing, said predetermined angular separation being the necessary angular separation of the faces of said split to make said bearing a preselected inside diameter when the said faces are brought into abutment by circumferential contraction of the bearing to close the split.

4. A method of preparing bearings of the split-sleeve type to provide bearings which when circumferentially closed will possess precise circularity, and which will consistently possess a precise desired closed-bearing inside diameter, said method comprising the steps: resiliently circumferentially expanding a split-sleeve bearing; telescoping the expanded bearing over an arbor having an outside diameter slightly larger than the normal inside diameter of such bearing; pressing said bearing against said arbor at a plurality of circumferential locations to secure the two together and ensure peripheral contact therebetween; machining a first face of the said split in the bearing radially with respect to said arbor; rotating said arbor and bearing together an amount equal to a predetermined angular separation; and machining a second face of the split in said bearing radially with respect to said arbor at the rotated position of the arbor and bearing, said predetermined separation being the necessary angular separation of the faces of said split to make said bearing a preselected inside diameter when the said faces are brought into abutment by circumferential contraction of the bearing to close the split.

5. The method of claim 4, wherein the said angular separation of the split faces is equal to the relationship $$\phi = \frac{360((OD_a - C) - ID)}{OD_a - C}$$

wherein $OD_a$ is the known outer diameter of the arbor, $C$ is the effective diametral compression of the bearing when pressed against the arbor, and $ID$ is the desired inside diameter of the bearing when contracted to close the slot.

6. A method of preparing bearings of the split sleeve type to provide bearings which when circumferentially closed will possess precise circularity, which will consistently possess a precise desired closed-bearing inside diameter, and whose true closed-bearing outside diameter may be accurately predicted, said method comprising the steps: resiliently circumferentially expanding a split-sleeve bearing; telescoping the expanded bearing over an arbor having an outside diameter slightly larger than the normal inside diameter of such bearing; machining a first face of the said split in the bearing radially with respect to said arbor; rotating said arbor and bearing together an amount equal to a predetermined angular separation; machining a second face of the split in said bearing radially with respect to said arbor at the rotated position of the arbor and bearing; said predetermined angular separation being the necessary angular separation of the faces of said split to make said bearing a preselected inside diameter when the said faces are brought into abutment by circumferential contraction of the bearing to close the split; and measuring the outside diameter of the expanded bearing upon the said arbor to predict the average outside diameter said bearing will have when circumferentially contracted to close said slot, said average outside diameter being equal to the relationship $$OD = \frac{OD_m(360-\phi)}{360}$$

wherein $OD_m$ is the said measured outside diameter, and $\phi$ is the said angular separation of the machined split faces.

7. The method of claim 6, wherein the said angular separation of the split faces is equal to the relationship $$\phi = \frac{360((OD_a-C)-ID)}{OD_a-C}$$

where in $OD_a$ is the known outer diameter of the arbor, C is the effective diametral compression of the bearing when pressed against the arbor, and ID is the desired inside diameter of the bearing when contracted to close the slot.

8. A method of preparing bearings of the split sleeve type to provide bearings which when circumferentially closed will possess precise circularity, which will consistently possess a precise desired closed-bearing inside diameter, and whose true closed-bearing outside diameter may be accurately predicted, said method comprising the steps: resiliently circumferentially expanding a split-sleeve bearing; telescoping the expanded bearing over an arbor having an outside diameter slightly larger than the normal inside diameter of such bearing; machining a first face of the said split in the bearing radially with respect to said arbor; rotating said arbor and bearing together an amount equal to a predetermined angular separation; machining a second face of the split in said bearing radially with respect to said arbor at the rotated position of the arbor and bearing; said predetermined angular separation being the necessary angular separation of the faces of said split to make said bearing a preselected inside diameter when the said faces are brought into abutment by circumferential contraction of the bearing to close the split; and measuring the outside diameter of the expanded bearing upon the said arbor to predict the average outside diameter said bearing will have when circumferentially contracted to close said slot; withdrawing said bearing from said arbor; contracting said bearing to close its split; and press-fitting the said bearing into a desired retaining sleeve to maintain it in its contracted state.

9. The method of claim 8, wherein said contracting is caused by and carried out simultaneously with said press-fitting.

10. A method of preparing bearings of the split-sleeve type to provide bearings which when circumferentially closed will possess precise circularity, and which will consistently possess a precise desired closed-bearing inside diameter, said method comprising the steps: telescoping the split-sleeve bearing over a suitable arbor; pressing said bearing circumferentially against said arbor to secure the two together and ensure peripheral contact therebetween; machining a first face of the said split in the bearing on a line falling on a radius of both said arbor and said bearing and machining a second face of the split in said bearing on a radius of both said arbor and said bearing, at a predetermined separation distance from said first face, said predetermined distance being the necessary separation distance of the faces of said split to make said bearing a preselected inside diameter when the said faces are brought into abutment by circumferential contraction of the bearing to close the split; said faces meeting on substantially the full cross-sectional area of the bearing sleeve to tightly close said split around both the internal and external periphery of said bearing.

11. A method of preparing bearings of the split-sleeve type to provide bearings which when circumferentially closed will possess precise circularity, and which will consistently possess a precise desired closed-bearing inside diameter, said method comprising the steps: telescoping the split-sleeve bearing over a suitable arbor; pressing said bearing circumferentially against said arbor at a plurality of different circumferential locations around the periphery of the bearing to secure the two together and ensure peripheral contact therebetween; machining a first face of the said split in the bearing on a line falling on a radius of both said arbor and said bearing; and machining a second face of the split in said bearing on a radius of both said arbor and said bearing, at a predetermined separation distance from said first face, said predetermined distance being the necessary separation distance of the faces of said split to make said bearing a preselected inside diameter when the said faces are brought into abutment by circumferential contraction of the bearing to close the split; said faces meeting on substantially the full cross-sectional area of the bearing sleeve to tightly close said split around both the internal and external periphery of said bearing.

12. A method of preparing bearings of the split-sleeve type to provide bearings which when circumferentially closed will possess precise circularity, and which will consistently possess a precise desired closed-bearing inside diameter, said method comprising the steps: telescoping the split-sleeve bearing over a suitable arbor; wrapping said bearing tightly about said arbor to conform the same thereto by progressively and sequentially applying pressure to the bearing at each of a plurality of different circumferential locations spaced around the periphery of the bearing, to secure the bearing to the arbor and ensure peripheral contact therebetween; machining a first face of the said split in the bearing on a line falling on a radius of both said arbor and said bearing; and machining a second face of the split in said bearing on a radius of both said arbor and said bearing, at a predetermined separation distance from said first face, said predetermined distance being the necessary separation distance of the faces of said split to make said bearing a preselected inside diameter when the said faces are brought into abutment by circumferential contraction of the bearing to close the split; said faces meeting on substantially the full cross-sectional area of the bearing sleeve to tightly close said split around both the internal and external periphery of said bearing.

References Cited

UNITED STATES PATENTS

| | | | |
|---|---|---|---|
| 1,256,672 | 2/1918 | Forsland | 72—340 |
| 1,971,433 | 8/1934 | Tartrais | 29—149.50 |
| 2,674,782 | 4/1954 | Surtees | 29—149.50 |

THOMAS H. EAGER, *Primary Examiner.*